United States Patent [19]
Huang

[11] Patent Number: 6,058,768
[45] Date of Patent: May 9, 2000

[54] APPARATUS FOR DETECTING PRESSURE CONDITION IN A PNEUMATIC TIRE

[76] Inventor: Tien-Tsai Huang, No. 4, Lane 30, Wu-Chuan St., Pan-Chiao City, Taipei Hsien, Taiwan

[21] Appl. No.: 09/019,963

[22] Filed: Feb. 6, 1998

[30] Foreign Application Priority Data

Dec. 8, 1997 [TW] Taiwan ................................ 86118441

[51] Int. Cl.$^7$ ................................................ B60C 23/02
[52] U.S. Cl. ........................................ 73/146.5; 340/448
[58] Field of Search .................... 73/146, 146.4, 73/146.5; 340/444, 448

[56] References Cited

U.S. PATENT DOCUMENTS

| | | |
|---|---|---|
| 3,662,335 | 5/1972 | Fritze . |
| 4,072,926 | 2/1978 | Shimahara et al. ................ 73/146.5 |
| 5,035,137 | 7/1991 | Burkard et al. . |
| 5,260,683 | 11/1993 | Tanaka et al. ........................ 340/448 |
| 5,289,161 | 2/1994 | Huang . |
| 5,741,966 | 4/1998 | Handfield et al. ................. 73/146.5 |

FOREIGN PATENT DOCUMENTS 3209660A 10/1983 Germany .

*Primary Examiner*—William Oen
*Attorney, Agent, or Firm*—Christensen O'Connor Johnson & Kindness PLLC

[57] ABSTRACT

In an apparatus for detecting the pressure condition in a pneumatic tire on a vehicle body, a pressure-responsive resonant switching device is mounted on the pneumatic tire and is switchable between a first impedance state, where pressure in the pneumatic tire is within a predetermined normal operating pressure range, and a second impedance state, where the pressure in the pneumatic tire is not within the predetermined normal operating pressure range. An excitation unit is mounted on the vehicle body adjacent to the pneumatic tire. A controller supplies an excitation signal to the excitation unit in order to enable the latter to co-act with the resonant switching device by virtue of mutual induction according to the impedance state of the resonant switching device for inducing current in the resonant switching device as the resonant switching device is moved so as to be proximate with the excitation unit due to rotation of the pneumatic tire relative to the vehicle body. The controller monitors an output signal from the excitation unit and detects the presence of a change in the output signal of the excitation unit due to inducing of the current in the resonant switching device during a complete cycle of rotation of the pneumatic tire to enable the controller to determine the pressure condition in the pneumatic tire.

31 Claims, 8 Drawing Sheets

APPARATUS FOR DETECTING PRESSURE CONDITION IN A PNEUMATIC TIRE

BACKGROUND OF THE INVENTION

1. Field of the Invention

The invention relates to the detection of pressure condition in a pneumatic tire, more particularly to an apparatus that employs a pressure-responsive resonant switching device in a pneumatic tire to co-act with an excitation unit on a vehicle body by virtue of mutual inductance in order to permit detection of the pressure condition in the pneumatic tire.

2. Description of the Related Art

Periodic monitoring of the pressure condition in a pneumatic tire is an important task for every car driver to ensure the safety of the vehicle. If an under-inflated tire condition exists, undue wearing of the pneumatic tire can easily occur and can lead to instability of the vehicle. In the event of an over-inflated tire condition, the pneumatic tire might explode while the vehicle is in motion.

U.S. Pat. No. 5,289,161 discloses a tire pressure indicator capable of generating an alarm signal whenever a pneumatic tire is under- or over-inflated. The tire pressure indicator includes a pressure gauge that has a casing attached to the pneumatic tire. A spring-loaded push rod in the casing of the pressure gauge moves, in response to the pressure of air that enters into the casing, between a first position in which the air pressure is below a predetermined low pressure limit, and a second position in which the air pressure is above a predetermined high pressure limit. A signal transmitting unit is provided in the casing of the pressure gauge, and has first and second switching devices which are controlled by the movement of the push rod. The first switching device activates the signal transmitting unit to transmit a first code when the push rod is in the first position, whereas the second switching device activates the signal transmitting unit to transmit a second code when the push rod is in the second position. A receiver device activates a first light emitting unit upon reception of the first code, and a second light emitting unit upon reception of the second code.

The aforementioned tire pressure indicator has the following drawbacks:

1. In use, a plurality of pressure gauges are needed for attachment to the pneumatic tires of a vehicle, respectively. Since each of the pressure gauges incorporates a signal transmitting unit and a power source, the tire pressure indicator is relatively expensive to implement.
2. The pressure gauges are relatively complex in construction and are bulky.
3. The receiver device receives the first and second codes wirelessly from the different pressure gauges. Such wireless transmission is susceptible to signal interference that can lead to improper operation of the tire pressure indicator.
4. Since the pressure gauges are attached to the inflating valves of the pneumatic tires, they are exposed when in use and are easily subject to damage or theft.

SUMMARY OF THE INVENTION

Therefore, the object of the present invention is to provide a pressure detecting apparatus that is capable of overcoming the aforesaid drawbacks commonly associated with the known tire pressure indicator described beforehand.

More specifically, the object of the present invention is to provide an apparatus for detecting the pressure condition in a pneumatic tire, wherein a pressure-responsive resonant switching device in the pneumatic tire co-acts with an excitation unit on a vehicle body by virtue of mutual inductance in order to permit detection of the pressure condition in the pneumatic tire.

According to one aspect of the invention, an apparatus for detecting the pressure condition in a pneumatic tire on a vehicle body comprises:

a pressure-responsive resonant switching device adapted to be mounted on the pneumatic tire and switchable among a first impedance state, where the pneumatic tire is under-inflated, a second impedance state, where the pressure in the pneumatic tire is within a predetermined normal operating pressure range, and a third impedance state, where the pneumatic tire is over-inflated;

an excitation unit adapted to be mounted on the vehicle body adjacent to the pneumatic tire; and a controller connected to the excitation unit and operable so as to supply an excitation signal to the excitation unit in order to enable the excitation unit to co-act with the resonant switching device by virtue of mutual induction according to the impedance state of the resonant switching device for inducing current in the resonant switching device as the resonant switching device is moved so as to be proximate with the excitation unit due to rotation of the pneumatic tire relative to the vehicle body, the controller monitoring an output signal from the excitation unit and detecting presence of a change in the output signal of the excitation unit due to inducing of the current in the resonant switching device during a complete cycle of rotation of the pneumatic tire to enable the controller to determine the pressure condition in the pneumatic tire.

According to another aspect of the invention, an apparatus for detecting the pressure condition in a set of pneumatic tires on a vehicle body comprises:

a set of pressure-responsive resonant switching devices adapted to be mounted respectively on the pneumatic tires, each of which is switchable among a first impedance state, where the respective one of the pneumatic tires is under-inflated, a second impedance state, where the pressure in the respective one of the pneumatic tires is within a predetermined normal operating pressure range, and a third impedance state, where the respective one of the pneumatic tires is over-inflated;

a set of excitation units adapted to be mounted on the vehicle body adjacent to the pneumatic tires, respectively; and a controller connected to the excitation units and operable so as to supply an excitation signal to each of the excitation units in order to enable each of the excitation units to co-act with a respective one of the resonant switching devices by virtue of mutual induction according to the impedance state of the respective one of the resonant switching devices for inducing current in the respective one of the resonant switching devices as the respective one of the resonant switching devices is moved so as to be proximate with the respective one of the excitation units due to rotation of the pneumatic tires relative to the vehicle body, the controller monitoring an output signal from each of the excitation units and detecting presence of a change in the output signals of the excitation units due to inducing of the current in the respective one of the resonant switching devices during a complete cycle of rotation of the pneumatic tires to enable the controller to determine the pressure condition in each of the pneumatic tires.

According to a further aspect of the invention, an apparatus for detecting the pressure condition in a pneumatic tire on a vehicle body comprises:

a pressure-responsive resonant switching device adapted to be mounted on the pneumatic tire and switchable between a first impedance state, where pressure in the pneumatic tire is within a predetermined normal operating pressure range, and a second impedance state, where the pressure in the pneumatic tire is not within the predetermined normal operating pressure range;

an excitation unit adapted to be mounted on the vehicle body adjacent to the pneumatic tire; and a controller connected to the excitation unit and operable so as to supply an excitation signal to the excitation unit in order to enable the excitation unit to co-act with the resonant switching device by virtue of mutual induction according to the impedance state of the resonant switching device for inducing current in the resonant switching device as the resonant switching device is moved so as to be proximate with the excitation unit due to rotation of the pneumatic tire relative to the vehicle body, the controller monitoring an output signal from the excitation unit and detecting presence of a change in the output signal of the excitation unit due to inducing of the current in the resonant switching device during a complete cycle of rotation of the pneumatic tire to enable the controller to determine the pressure condition in the pneumatic tire.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
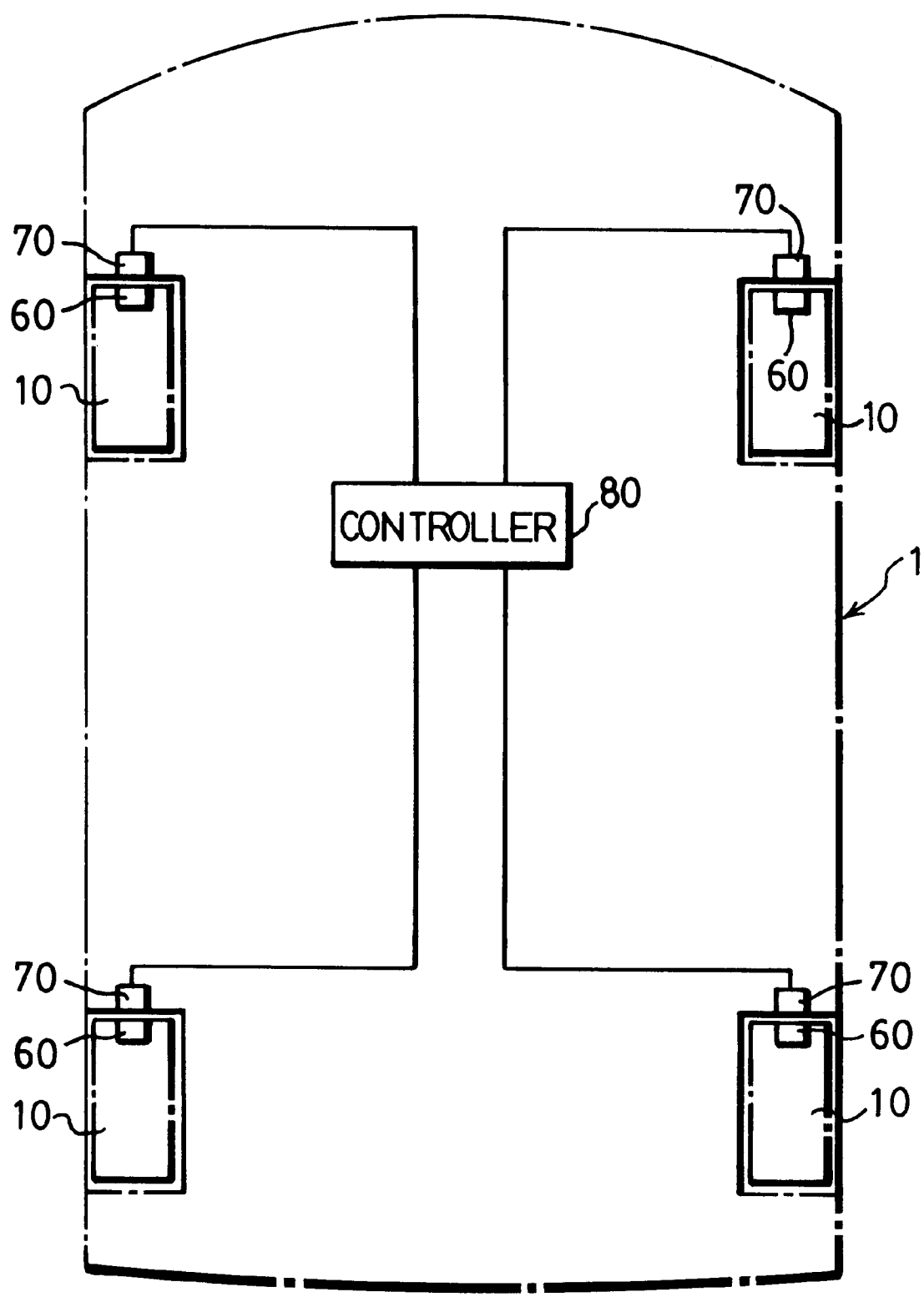
FIG. 1 is a schematic view illustrating the first preferred embodiment of a pressure condition detecting apparatus according to the present invention when installed on a vehicle.
Figure 2:
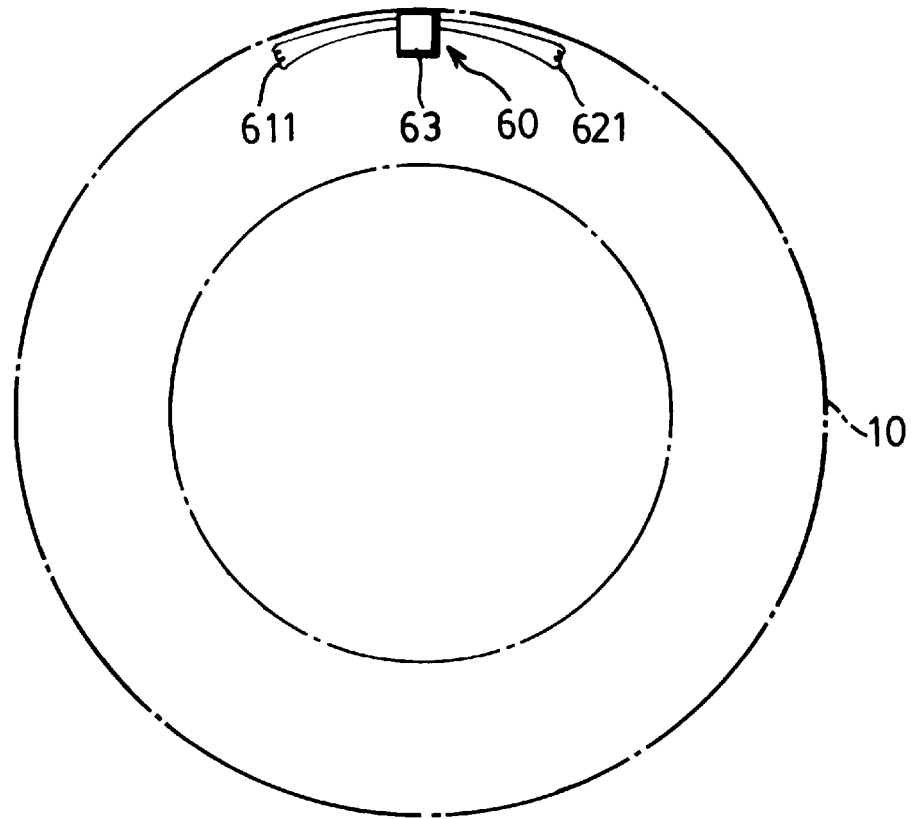
FIG. 2 is a schematic view illustrating a pressure-responsive resonant switching device mounted in a pneumatic tire in accordance with the first preferred embodiment.
Figure 3:
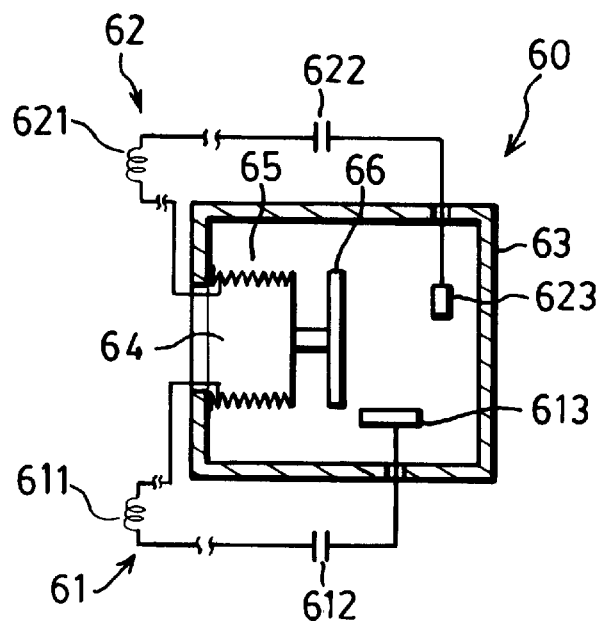
FIG. 3 is a schematic view illustrating the pressure-responsive resonant switching device of the first preferred embodiment in an under-inflated switch position.
Figure 4A:
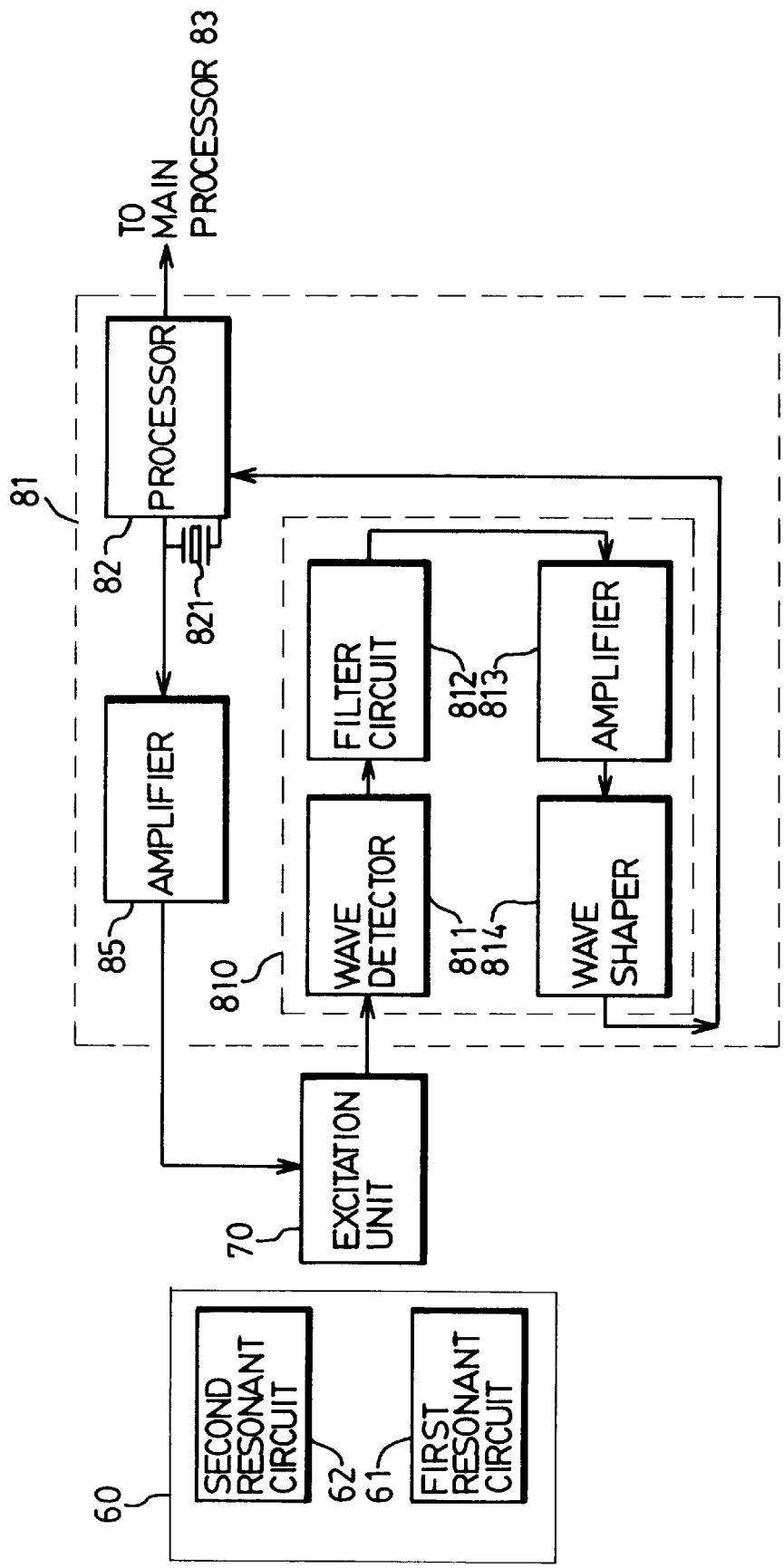
FIGS. 4a and 4b are schematic circuit block diagrams of the first preferred embodiment.
Figure 4B:
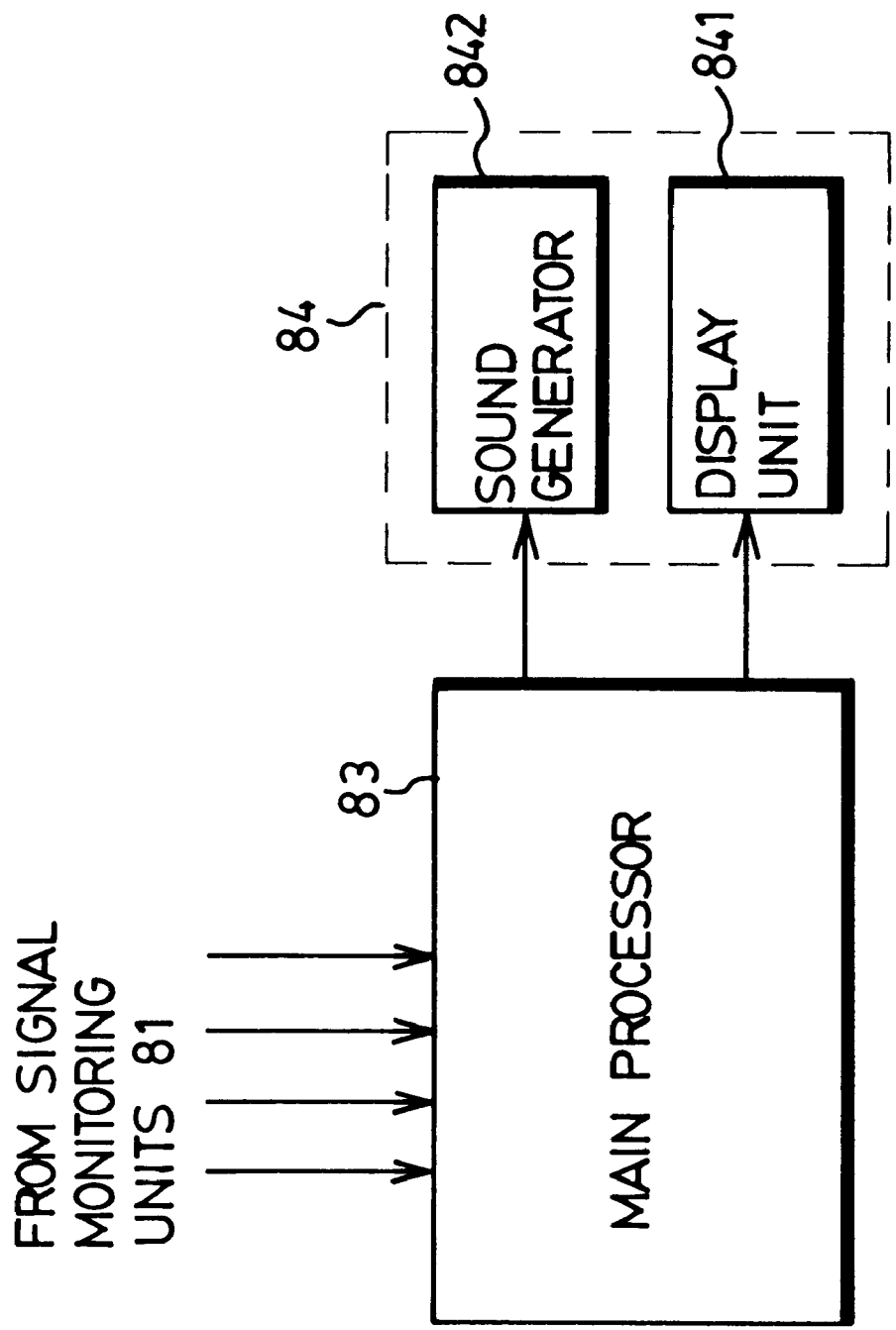
Figure 5:
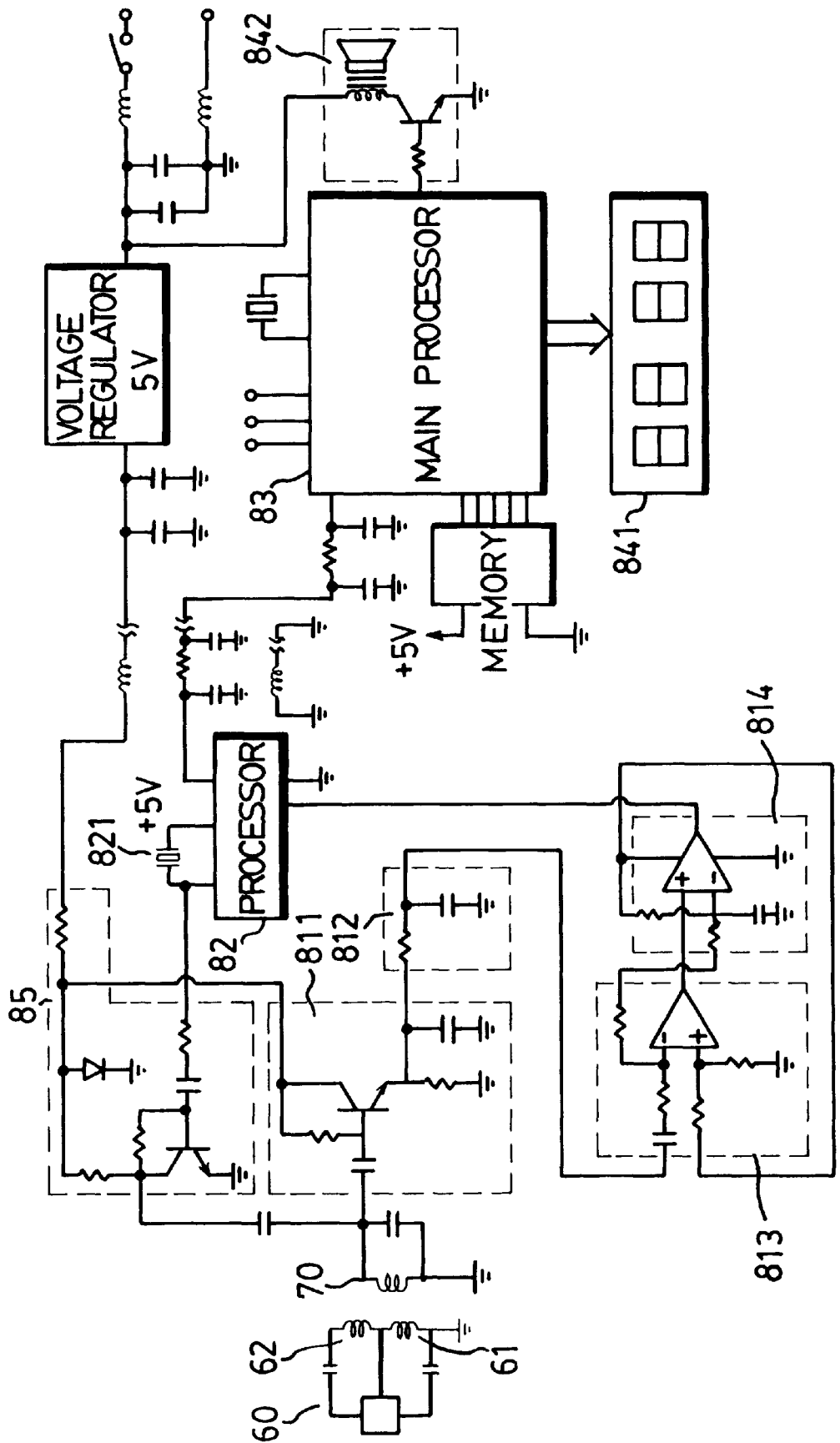
FIG. 5 is a schematic electrical circuit diagram of the first preferred embodiment.

Before the present invention is described in greater detail, it should be noted that like elements are denoted by the same reference numerals throughout the disclosure.

Referring to FIGS. 1 to 5, the first preferred embodiment of a pressure condition detecting apparatus according to the present invention is shown to comprise a set of pressure-responsive resonant switching devices 60, a set of excitation units 70, and a controller 80 connected to the excitation units 70. Each of the resonant switching devices 60 is mounted inside a respective pneumatic tire 10 on a vehicle body 1. The excitation units 70 are mounted on the vehicle body 1 adjacent to the pneumatic tires 10, respectively. The controller 80 supplies an excitation signal to each of the excitation units 70, and monitors the output signals of the latter. By processing the output signals of the excitation units 70, the controller 80 is able to determine the pressure condition in each of the pneumatic tires 10 and generates a corresponding alarm output to alert the driver of the vehicle.

Figure 6:
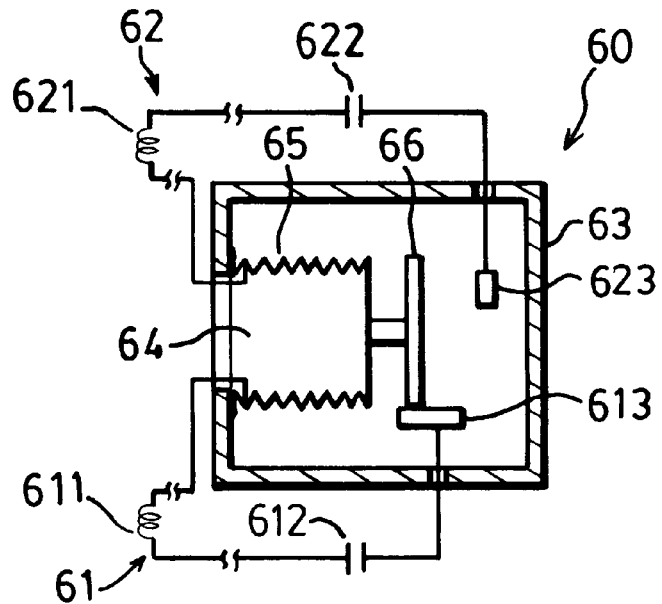
FIG. 6 is a schematic view illustrating the pressure-responsive resonant switching device of the first preferred embodiment in a normal operating switch position.
Figure 7:
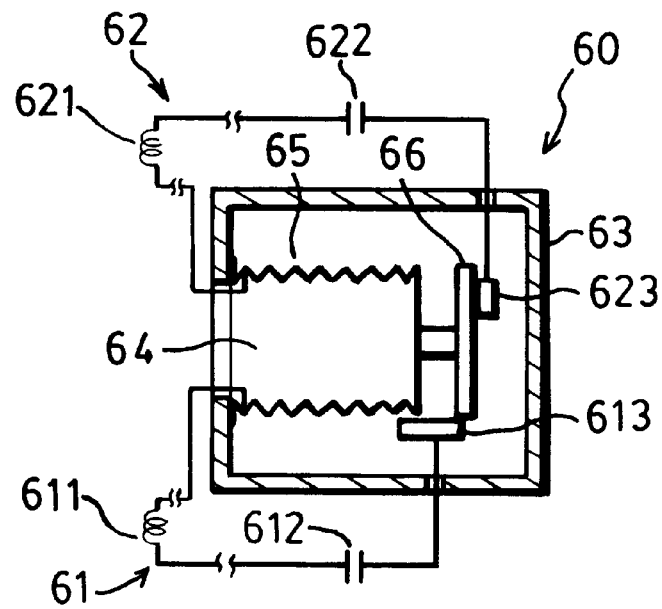
FIG. 7 is a schematic view illustrating the pressure-responsive resonant switching device of the first preferred embodiment in an over-inflated switch position.

In this embodiment, each of the resonant switching devices 60 includes first and second resonant circuits 61, 62, each of which has a coil 611, 621 that functions as an inductor, and a capacitor 612, 622. The coils 611, 621 of the first and second resonant circuits 61, 62 are angularly displaced on the interior of the respective pneumatic tire 10. Each of the coils 611, 621 has a first end, and a second end connected to a first end of the corresponding capacitor 612, 622. Each of the resonant switching devices 60 further includes a casing 63 mounted inside the respective pneumatic tire 10. The casing 63 has one side formed with an opening 64. The second end of each capacitor 612, 622 is connected to a corresponding stationary electrical contact 613, 623 that is disposed in the casing 63. A movable electrical contact 66, which is connected to the first end of the coils 611, 621, is disposed in the casing 63 and is movable in the latter in response to the pressure of air that enters into the casing 63 via the opening 64. In this embodiment, the movable electrical contact 66 is movable among an under-inflated switch position (see FIG. 3), where the movable electrical contact 66 is not in contact with either of the stationary electrical contacts 613, 623 to disable both of the first and second resonant circuits 61, 62, a normal operating switch position (see FIG. 6), where the movable electrical contact 66 is in contact with the stationary electrical contact 613 so that the coil 611 and the capacitor 612 of the first resonant circuit 61 form a closed loop while the second resonant circuit 62 remains disabled, and an over-inflated switch position (see FIG. 7), where the movable electrical contact 66 is in contact with both of the stationary electrical contacts 613, 623 so that the coils 611, 621 form closed loops with the capacitors 612, 622.

In this embodiment, a volume-variable member 65, such as a bellows tube, has an open end mounted on the casing 63 around the opening 64, and a closed end with the movable electrical contact 66 mounted thereon. Based on the pressure inside the respective pneumatic tire 10, the volume-variable member 65 expands to displace the movable electrical contact 66 linearly in the casing 63 to one of the under-inflated switch position, the normal operating switch position and the over-inflated switch position.

The connection between the first end of the coils 611, 621 and the movable electrical contact 66 can be achieved in many ways. For example, both the casing 63 and the volume-variable member 65 can be made of a conductive material. Thus, by connecting the first ends of the coils 611, 621 to the casing 63, electrical connection can be established between the coils 611, 621 and the movable electrical contact 66. In the event that the casing 63 is made of an insulating material, the first end of the coils 611, 621 can be connected directly to the conductive volume-variable member 65.

The excitation units 70 are in the form of coils that function as inductors. When the pneumatic tires 10 rotate, each of the coils 611, 621 of the resonant switching devices 60 is moved to be proximate with the respective excitation unit 70 once every complete cycle of rotation of the respective pneumatic tire 10. Each of the resonant switching devices 60 co-acts with the respective excitation unit 70 by virtue of mutual inductance according to the impedance state of the resonant switching devices 60, e.g. when one or both of the first and second resonant circuits 61, 62 thereof form closed loops, thereby inducing current in the closed resonant circuits 61, 62 as the coils 611, 621 thereof are proximate with the respective excitation unit 70. The induced current results from the supply of the excitation signal to the excitation units 70 by the controller 80. Inducing of current in the closed resonant circuits 61, 62 by the respective excitation unit 70 results in a change in the output signal of the latter. Since the controller 80 monitors the output signals of the excitation units 70, the former is able to determine the pressure condition in each of the pneumatic tires 10 by detecting the frequency of change in the output signals of the excitation units 70.

Referring to FIGS. 1, 4a, 4b and 5, the controller 80 is disposed in a passenger room (not shown) of the vehicle body 1 and includes a set of signal monitoring units 81 connected to the excitation units 70, respectively, a main processor 83 connected to the signal monitoring units 81, and an indicating device 84 connected to the main processor 83.

The signal monitoring units 81 provide the excitation signal to the respective excitation unit 70 and monitor the output signal of the latter. Each signal monitoring unit 81 includes a signal detector 810, a processor 82, and an amplifier 85 connected to the respective excitation unit 70.

The processor 82 is connected to a crystal oscillator 821, and is programmed so as to generate an oscillating signal that is amplified by the amplifier 85, thereby resulting in the excitation signal that is supplied to the respective excitation unit 70. The signal detector 810 is connected to the respective excitation unit 70 so as to receive the output signal of the latter. The signal detector 810 includes a wave detector 811, a filter circuit 812 for removing unwanted frequencies, an amplifier 813 and a wave shaper 814 connected to the processor 82. In this embodiment, the output of the wave shaper 814 is in the form of pulse signals, each of which corresponds to a detected change in the output signal of the respective excitation unit 70 caused by mutual inductance between the excitation unit 70 and the respective resonant switching device 60, and is received by the processor 82.

The processor 82 detects the frequency of the pulse signals received from the wave shaper 814 within a predetermined time period. Particularly, if the movable electrical contact 66 of one of the resonant switching devices 60 is in the under-inflated switch position (see FIG. 3), no pulse signal is received by the corresponding processor 82 after one complete rotation of the respective pneumatic tire 10. If the movable electrical contact 66 of one of the resonant switching devices 60 is in the normal operating switch position (see FIG. 6), one pulse signal is received by the corresponding processor 82 after one complete rotation of the respective pneumatic tire 10. If the movable electrical contact 66 of one of the resonant switching devices 60 is in the over-inflated switch position (see FIG. 7), two pulse signals are received by the corresponding processor 82 after one complete rotation of the respective pneumatic tire 10.

The processor 82 of each of the signal monitoring units 810 is connected to the main processor 83. Upon detection of an under-inflated or over-inflated tire condition, the processor 82 informs the main processor 83 of the same. At this time, the main processor 83 activates the indicating device 84 to inform the driver of the vehicle of the presence of an abnormal tire pressure condition. In this embodiment, the indicating device 84 includes a display unit 841 that is controlled by the main processor 83 for visual identification of the pneumatic tire 10 with the abnormal pressure condition, and the pressure status of the identified abnormal pneumatic tire 10, and a sound generator 842 for alerting the driver of the vehicle of the presence of an abnormal tire pressure condition.

Figure 8:
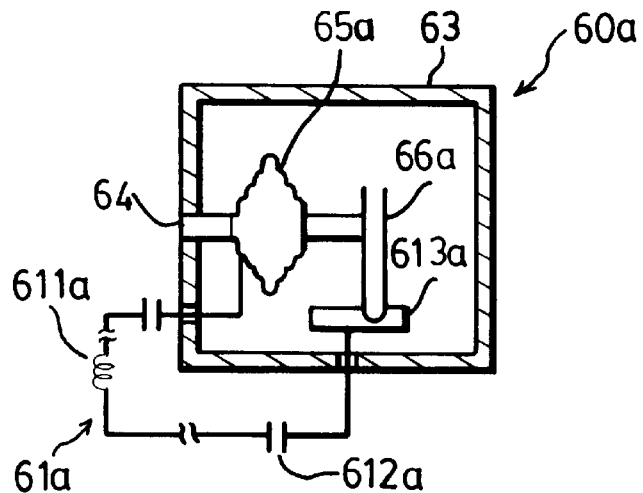
FIG. 8 is a schematic view illustrating a pressure-responsive resonant switching device according to the second preferred embodiment of a pressure condition detecting apparatus of this invention.

FIG. 8 illustrates a pressure-responsive resonant switching device 60a according to the second preferred embodiment of a pressure condition detecting apparatus of this invention. The resonant switching device 60a includes a resonant circuit 61a having a coil 611a that functions as an inductor, and a capacitor 612a. The coil 611a has a first end, and a second end connected to a first end of the capacitor 612a. The resonant switching device 60a further includes a casing 63 to be mounted inside a pneumatic tire. The casing 63 has one side formed with an opening 64. The second end of the capacitor 612a is connected to a stationary electrical contact 613a that is disposed in the casing 63. A movable electrical contact 66a, which is connected to the first end of the coil 611a, is disposed in the casing 63 and is movable in the latter in response to the pressure of air that enters into the casing 63 via the opening 64. In this embodiment, the movable electrical contact 66a is movable between a normal operating switch position, where the movable electrical contact 66a is in contact with the stationary electrical contact 613a so that the coil 611a and the capacitor 612a of the resonant circuit 61a form a closed loop, and an abnormal operating switch position, where the movable electrical contact 66a is not in contact with the stationary electrical contact 613a so that the resonant circuit 61a is disabled.

Like the previous embodiment, a volume-variable member 65a, such as a bellows tube, has an open end mounted on the casing 63 around the opening 64, and a closed end with the movable electrical contact 66a mounted thereon. Based on the pressure inside the pneumatic tire, the volume-variable member 65a expands to displace the movable electrical contact 66a linearly in the casing 63 to the normal operating switch position or the abnormal operating switch position.

The connection between the first end of the coil 611a and the movable electrical contact 66a is achieved in a manner similar to that of the previous embodiment and will not be detailed further.

Figure 9:
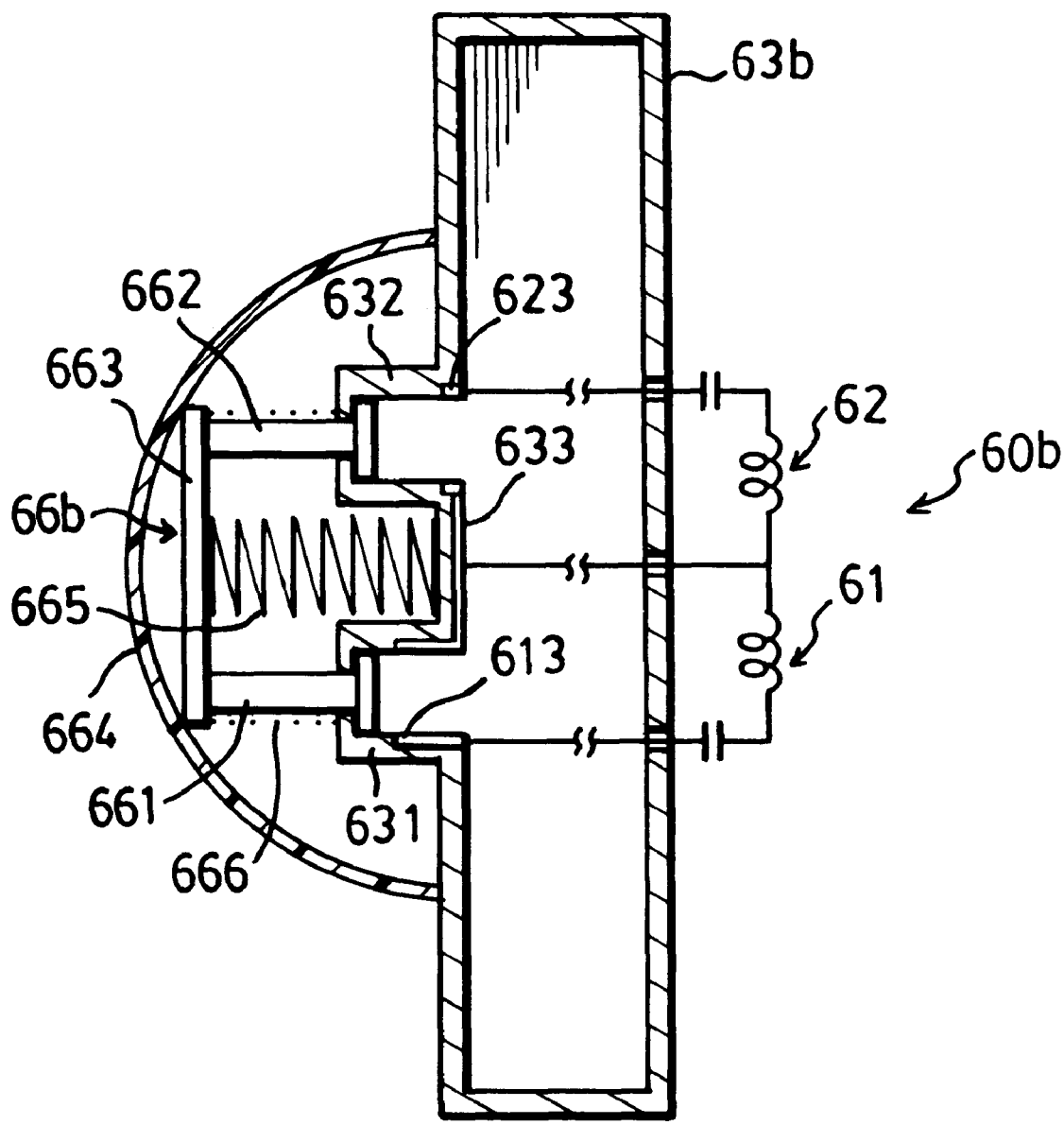
FIG. 9 is a schematic view illustrating a pressure-responsive resonant switching device according to the third preferred embodiment of a pressure condition detecting apparatus of this invention.

FIG. 9 illustrates a pressure-responsive resonant switching device 60b according to the third preferred embodiment of a pressure condition detecting apparatus of this invention. The resonant switching device 60b includes first and second resonant circuits 61, 62, like those of the first preferred embodiment. The resonant switching device 60b further includes a casing 63b mounted inside the pneumatic tire and having first and second guide tubes 631, 632, first and second stationary electrical contacts 613, 623 provided respectively in the first and second guide tubes 631, 632, a common electrical contact 633 extending into the first and second guide tubes 631, 632, and a movable electrical contact 66b having a pair of contact arms 661, 662 that extend respectively into the first and second guide tubes 631, 632. The movable electrical contact 66b further has a force bearing plate 663 that interconnects one end of the contact arms 661, 662 outside the casing 63b. A resilient cover 664 is mounted on one side of the casing 63b to cover the movable electrical contact 66b. The coil and the capacitor of the first and second resonant circuits 61, 62 are connected to the common electrical contact 633 and one of the stationary electrical contacts 613, 623, respectively. The movable electrical contact 66b is movable, in response to the pressure inside the pneumatic tire, among an under-inflated switch position, where the movable electrical contact 66b is not in contact with either of the stationary electrical contacts 613, 623, a normal operating switch position, where the contact arm 661 of the movable electrical contact 66b connects the common electrical contact 633 with the stationary electrical contact 613 to enable the first resonant circuit 61 to form a closed loop, and an over-inflated switch position, where the contact arms 661, 662 connect the common electrical contact 633 with the stationary electrical contacts 613, 623 to enable the first and second resonant circuits 61, 62 to form closed loops. Inner and outer springs 665, 666 bias the movable electrical contact 66b to the under-inflated switch position. The operation of the third preferred embodiment is similar to that of the first preferred embodiment and will not be detailed herein.

Figure 10:
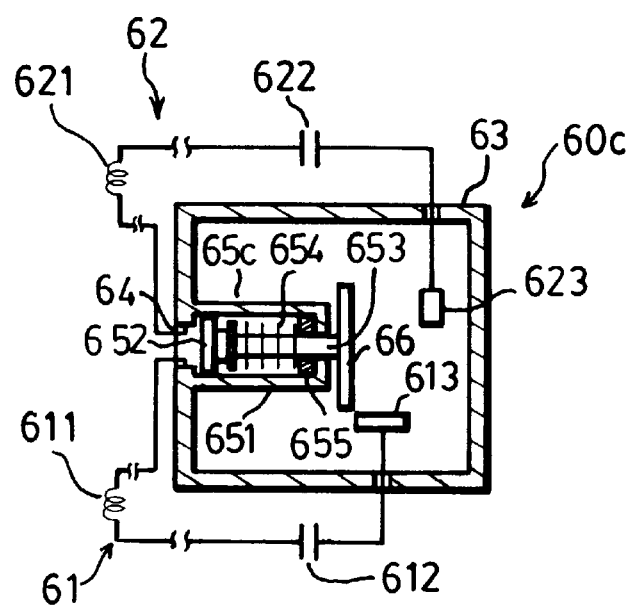
FIG. 10 is a schematic view illustrating a pressure-responsive resonant switching device according to the fourth preferred embodiment of a pressure condition detecting apparatus of this invention.

FIG. 10 illustrates a pressure-responsive resonant switching device 60c according to the fourth preferred embodiment of a pressure condition detecting apparatus of this invention. Unlike the first preferred embodiment, a spring-loaded piston device 65c is employed to displace the movable electrical contact 66 linearly in the casing 63 to one of the under-inflated switch position, the normal operating switch position, and the over-inflated switch position. As shown, the piston device 65c includes a tubular seat 651 on the casing 63 around the opening 64, a piston 652 disposed slidably in the tubular seat 651, a piston shaft 653 extending from one side of the piston 652 opposite to the opening 64 and extending out of the tubular seat 651 for mounting of the movable electrical contact 66 thereon, a spring 654 sleeved on the piston shaft 653 for biasing the piston 652 toward the opening 64, and a seal ring 655 around the piston shaft 653. The piston 652 moves in the tubular seat 651 against the action of the spring 654 in accordance with the pressure inside the pneumatic tire to result in corresponding movement of the movable electrical contact 66 together with the piston shaft 653 to one of the under-inflated switch position, the normal operating switch position and the over-inflated switch position.

The pressure condition detecting apparatus has the following advantages: A pressure-responsive resonant switching device is used for each pneumatic tire. Since the need for wireless transmitters has been obviated, the apparatus of this invention is relatively inexpensive to implement, has a small and compact construction, and is less susceptible to improper operation. In addition, the various components of the apparatus are hidden when in use so as not to be easily subject to damage or theft.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. An apparatus for detecting pressure condition in a pneumatic tire on a vehicle body, comprising:

a pressure-responsive resonant switching device adapted to be mounted on the pneumatic tire and switchable among a first impedance state, where the pneumatic tire is under-inflated, a second impedance state, where the pressure in the pneumatic tire is within a predetermined normal operating pressure range, and a third impedance state, where the pneumatic tire is over-inflated;

an excitation unit adapted to be mounted on the vehicle body adjacent to the pneumatic tire; and a controller connected to said excitation unit and operable so as to supply an excitation signal to said excitation unit in order to enable said excitation unit to co-act with said resonant switching device by virtue of mutual induction according to the impedance state of said resonant switching device for inducing current in said resonant switching device as said resonant switching device is moved so as to be proximate with said excitation unit due to rotation of the pneumatic tire relative to the vehicle body, said controller monitoring an output signal from said excitation unit and detecting presence of a change in the output signal of said excitation unit due to inducing of the current in said resonant switching device during a complete cycle of rotation of the pneumatic tire to enable said controller to determine the pressure condition in the pneumatic tire.

2. The apparatus as claimed in claim 1, wherein said excitation unit is a coil member.

3. The apparatus as claimed in claim 2, wherein said resonant switching device includes:

a casing adapted to be mounted inside the pneumatic tire and having first and second stationary electrical contacts and a movable electrical contact disposed therein;

displacement means, mounted to said casing, for moving said movable electrical contact among a first switch position, where said movable electrical contact is not in contact with either of said first and second stationary electrical contacts, a second switch position, where said movable electrical contact is in contact with one of said first and second stationary electrical contacts, and a third switch position, where said movable electrical contact is in contact with both of said first and second stationary electrical contacts, according to the pressure inside the pneumatic tire; and first and second resonant circuits, each of which includes a coil and a capacitor connected to said coil, said coil and said capacitor being further connected to said movable electrical contact and one of said first and second stationary electrical contacts, respectively, said coils of said first and second resonant circuits being adapted to be disposed in the pneumatic tire such that said coils of said first and second resonant circuits are angularly displaced in the pneumatic tire.

4. The apparatus as claimed in claim 3, wherein said movable electrical contact disables both of said first and second resonant circuits when in the first switch position to obtain the first impedance state, said movable electrical contact enabling one of said first and second resonant circuits to form a closed loop while disabling the other one of said first and second resonant circuits when in the second switch position to obtain the second impedance state, said movable electrical contact enabling both of said first and second resonant circuits to form closed loops when in the third switch position to obtain the third impedance state.

5. The apparatus as claimed in claim 3, wherein said casing is formed with an opening, said displacement means including a volume-variable member disposed in said casing, said volume-variable member having an open end mounted on said casing around said opening, and a closed end with said movable electrical contact mounted thereon.

6. The apparatus as claimed in claim 1, wherein said controller comprises a signal monitoring unit which is connected to said excitation unit and which includes:

means for generating an oscillating signal that serves as the excitation signal for said excitation unit;

means for detecting the change in the output signal of said excitation unit and for generating a pulse signal corresponding to the detected change in the output signal of said excitation unit; and means for detecting the frequency of the pulse signal within the complete cycle of rotation of the pneumatic tire to determine the pressure condition in the pneumatic tire.

7. The apparatus as claimed in claim 6, wherein said controller further comprises a main processor connected to said signal monitoring unit, and an indicating device connected to and controlled by said main processor to indicate that the pneumatic tire is under-inflated or over-inflated.

8. The apparatus as claimed in claim 2, wherein said resonant switching device includes:

a casing adapted to be mounted inside the pneumatic tire and having first and second guide tubes, first and second stationary electrical contacts provided respectively in said first and second guide tubes, a common electrical contact extending into said first and second guide tubes, and a movable electrical contact having a pair of contact arms that extend respectively into said first and second guide tubes, said movable electrical contact being movable among a first switch position, where said movable electrical contact is not in contact with either of said first and second stationary electrical contacts, a second switch position, where said movable electrical contact connects one of said first and second stationary electrical contacts with said common electrical contact, and a third switch position, where said movable electrical contact connects both of said first and second stationary electrical contacts with said common electrical contact, according to the pressure inside the pneumatic tire; and first and second resonant circuits, each of which includes a coil and a capacitor connected to said coil, said coil and said capacitor being further connected to said common electrical contact and one of said first and second stationary electrical contacts, respectively, said coils of said first and second resonant circuits being adapted to be disposed in the pneumatic tire such that said coils of said first and second resonant circuits are angularly displaced in the pneumatic tire.

9. The apparatus as claimed in claim 8, wherein said movable electrical contact disables both of said first and second resonant circuits when in the first switch position to obtain the first impedance state, said movable electrical contact enabling one of said first and second resonant circuits to form a closed loop while disabling the other one of said first and second resonant circuits when in the second switch position to obtain the second impedance state, said movable electrical contact enabling both of said first and second resonant circuits to form closed loops when in the third switch position to obtain the third impedance state.

10. The apparatus as claimed in claim 9, wherein said resonant switching device further includes biasing means for biasing said movable electrical contact to the first switch position.

11. The apparatus as claimed in claim 3, wherein said casing is formed with an opening, said displacement means including a spring-loaded piston device mounted inside said casing at said opening and having said movable electrical contact mounted thereon, said spring-loaded piston device moving said movable electrical contact in response to pressure entering said casing via said opening.

12. The apparatus as claimed in claim 11, wherein said piston device includes a tubular seat on said casing around said opening, a piston disposed slidably in said tubular seat, a piston shaft extending from one side of said piston opposite to said opening and extending out of said tubular seat for mounting of said movable electrical contact thereon, and a spring for biasing said piston toward said opening.

13. An apparatus for detecting pressure condition in a set of pneumatic tires on a vehicle body, comprising:

a set of pressure-responsive resonant switching devices adapted to be mounted respectively on the pneumatic tires, each of which is switchable among a first impedance state, where the respective one of the pneumatic tires is under-inflated, a second impedance state, where the pressure in the respective one of the pneumatic tires is within a predetermined normal operating pressure range, and a third impedance state, where the respective one of the pneumatic tires is over-inflated;

a set of excitation units adapted to be mounted on the vehicle body adjacent to the pneumatic tires, respectively; and a controller connected to said excitation units and operable so as to supply an excitation signal to each of said excitation units in order to enable each of said excitation units to co-act with a respective one of said resonant switching devices by virtue of mutual induction according to the impedance state of the respective one of said resonant switching devices for inducing current in the respective one of said resonant switching devices as the respective one of said resonant switching devices is moved so as to be proximate with the respective one of said excitation units due to rotation of the pneumatic tires relative to the vehicle body, said controller monitoring an output signal from each of said excitation units and detecting presence of a change in the output signals of said excitation units due to inducing of the current in the respective one of said resonant switching devices during a complete cycle of rotation of the pneumatic tires to enable said controller to determine the pressure condition in each of the pneumatic tires.

14. The apparatus as claimed in claim 13, wherein each of said excitation units is a coil member.

15. The apparatus as claimed in claim 14, wherein each of said resonant switching devices includes:

a casing adapted to be mounted inside the respective one of the pneumatic tires and having first and second stationary electrical contacts and a movable electrical contact disposed therein;

displacement means, mounted to said casing, for moving said movable electrical contact among a first switch position, where said movable electrical contact is not in contact with either of said first and second stationary electrical contacts, a second switch position, where said movable electrical contact is in contact with one of said first and second stationary electrical contacts, and a third switch position, where said movable electrical contact is in contact with both of said first and second stationary electrical contacts, according to the pressure inside the respective one of the pneumatic tires; and first and second resonant circuits, each of which includes a coil and a capacitor connected to said coil, said coil and said capacitor being further connected to said movable electrical contact and one of said first and second stationary electrical contacts, respectively, said coils of said first and second resonant circuits being adapted to be disposed in the respective one of the pneumatic tires such that said coils of said first and second resonant circuits are angularly displaced in the respective one of the pneumatic tires.

16. The apparatus as claimed in claim 15, wherein said movable electrical contact disables both of said first and second resonant circuits when in the first switch position to obtain the first impedance state, said movable electrical contact enabling one of said first and second resonant circuits to form a closed loop while disabling the other one of said first and second resonant circuits when in the second switch position to obtain the second impedance state, said movable electrical contact enabling both of said first and second resonant circuits to form closed loops when in the third switch position to obtain the third impedance state.

17. The apparatus as claimed in claim 15, wherein said casing is formed with an opening, said displacement means including a volume-variable member disposed in said casing, said volume-variable member having an open end mounted on said casing around said opening, and a closed end with said movable electrical contact mounted thereon.

18. The apparatus as claimed in claim 13, wherein said controller comprises a set of signal monitoring units which are connected respectively to said excitation units and which include:

means for generating an oscillating signal that serves as the excitation signal for the respective one of said excitation units;

means for detecting the change in the output signal of the respective one of said excitation units and for generating a pulse signal corresponding to the detected change in the output signal of the respective one of said excitation units; and means for detecting the frequency of the pulse signal within the complete cycle of rotation of the respective one of the pneumatic tires to determine the pressure condition in the respective one of the pneumatic tires.

19. The apparatus as claimed in claim 18, wherein said controller further comprises a main processor connected to said signal monitoring units, and an indicating device connected to and controlled by said main processor to indicate which one of the pneumatic tires is under-inflated or over-inflated.

20. The apparatus as claimed in claim 19, wherein said indicating device includes a display unit for visual identification of the pneumatic tire that is under-inflated or over-inflated.

21. The apparatus as claimed in claim 19, wherein said indicating device includes a sound generator for generating an audible alarm output when one of the pneumatic tires is under-inflated or over-inflated.

22. The apparatus as claimed in claim 14, wherein each of said resonant switching devices includes:

a casing adapted to be mounted inside the respective one of the pneumatic tires and having first and second guide tubes, first and second stationary electrical contacts provided respectively in said first and second guide tubes, a common electrical contact extending into said first and second guide tubes, and a movable electrical contact having a pair of contact arms that extend respectively into said first and second guide tubes, said movable electrical contact being movable among a first switch position, where said movable electrical contact is not in contact with either of said first and second stationary electrical contacts, a second switch position, where said movable electrical contact connects one of said first and second stationary electrical contacts with said common electrical contact, and a third switch position, where said movable electrical contact connects both of said first and second stationary electrical contacts with said common electrical contact, according to the pressure inside the respective one of the pneumatic tires; and first and second resonant circuits, each of which includes a coil and a capacitor connected to said coil, said coil and said capacitor being further connected to said common electrical contact and one of said first and second stationary electrical contacts, respectively, said coils of said first and second resonant circuits being adapted to be disposed in the respective one of the pneumatic tires such that said coils of said first and second resonant circuits are angularly displaced in the respective one of the pneumatic tires.

23. The apparatus as claimed in claim 22, wherein said movable electrical contact disables both of said first and second resonant circuits when in the first switch position to obtain the first impedance state, said movable electrical contact enabling one of said first and second resonant circuits to form a closed loop while disabling the other one of said first and second resonant circuits when in the second switch position to obtain the second impedance state, said movable electrical contact enabling both of said first and second resonant circuits to form closed loops when in the third switch position to obtain the third impedance state.

24. The apparatus as claimed in claim 23, wherein each of said resonant switching devices further includes biasing means for biasing said movable electrical contact to the first switch position.

25. The apparatus as claimed in claim 15, wherein said casing is formed with an opening, said displacement means including a spring-loaded piston device mounted inside said casing at said opening and having said movable electrical contact mounted thereon, said spring-loaded piston device moving said movable electrical contact in response to pressure entering said casing via said opening.

26. The apparatus as claimed in claim 25, wherein said piston device includes a tubular seat on said casing around said opening, a piston disposed slidably in said tubular seat, a piston shaft extending from one side of said piston opposite to said opening and extending out of said tubular seat for mounting of said movable electrical contact thereon, and a spring for biasing said piston toward said opening.

27. An apparatus for detecting pressure condition in a pneumatic tire on a vehicle body, comprising:

a pressure-responsive resonant switching device adapted to be mounted on the pneumatic tire and switchable between a first impedance state, where pressure in the pneumatic tire is within a predetermined normal operating pressure range, and a second impedance state, where the pressure in the pneumatic tire is not within the predetermined normal operating pressure range;

an excitation unit adapted to be mounted on the vehicle body adjacent to the pneumatic tire; and a controller connected to said excitation unit and operable so as to supply an excitation signal to said excitation unit in order to enable said excitation unit to co-act with said resonant switching device by virtue of mutual induction according to the impedance state of said resonant switching device for inducing current in said resonant switching device as said resonant switching device is moved so as to be proximate with said excitation unit due to rotation of the pneumatic tire relative to the vehicle body, said controller monitoring an output signal from said excitation unit and detecting presence of a change in the output signal of said excitation unit due to inducing of the current in said resonant switching device during a complete cycle of rotation of the pneumatic tire to enable said controller to determine the pressure condition in the pneumatic tire.

28. The apparatus as claimed in claim 27, wherein said excitation unit is a coil member.

29. The apparatus as claimed in claim 28, wherein said resonant switching device includes:

a casing adapted to be mounted inside the pneumatic tire and having a stationary electrical contact and a movable electrical contact disposed therein;

displacement means, mounted to said casing, for moving said movable electrical contact between a first switch position, where said movable electrical contact is not in contact with said stationary electrical contact, and a second switch position, where said movable electrical contact is in contact with said stationary electrical contact, according to the pressure inside the pneumatic tire; and a resonant circuit including a coil and a capacitor connected to said coil, said coil and said capacitor being further connected to said movable electrical contact and said stationary electrical contact, respectively.

30. The apparatus as claimed in claim 29, wherein said movable electrical contact disables said resonant circuit when in the first switch position to obtain the first impedance state, and enables said resonant circuit to form a closed loop when in the second switch position to obtain the second impedance state.

31. The apparatus as claimed in claim 29, wherein said casing is formed with an opening, said displacement means including a volume-variable member disposed in said casing, said volume-variable member having an open end mounted on said casing around said opening, and a closed end with said movable electrical contact mounted thereon.

* * * * *